United States Patent [19]
Endemann

[11] Patent Number: 6,118,579
[45] Date of Patent: *Sep. 12, 2000

[54] PLANETARY ASTROGRAPHIC TELESCOPE

[76] Inventor: Thomas R. Endemann, 1157 Wells St., Apt. #3, Lake Geneva, Wis. 53147

[ * ] Notice: This patent issued on a continued prosecution application filed under 37 CFR 1.53(d), and is subject to the twenty year patent term provisions of 35 U.S.C. 154(a)(2).

[21] Appl. No.: 09/055,149

[22] Filed: Apr. 4, 1998

[51] Int. Cl.$^7$ ................................... G02B 17/00
[52] U.S. Cl. .................. 359/366; 359/364; 359/365; 359/366; 359/857; 359/858; 359/859
[58] Field of Search ................... 359/358, 359, 359/364, 365, 366, 399, 856, 857, 858, 859

[56] References Cited

U.S. PATENT DOCUMENTS

| | | | |
|---|---|---|---|
| 3,942,865 | 3/1976 | Rand | 350/83 |
| 3,968,362 | 7/1976 | Mocker | 250/216 |
| 4,061,420 | 12/1977 | Kaprelian et al. | 350/199 |
| 4,226,501 | 10/1980 | Shafer | 350/55 |
| 4,571,036 | 2/1986 | Gebelein et al. | 350/503 |
| 4,842,384 | 6/1989 | Mercado | 359/648 |
| 4,882,772 | 11/1989 | Rist et al. | 455/617 |
| 5,347,401 | 9/1994 | Hugenell | 359/853 |
| 5,471,346 | 11/1995 | Ames | 359/731 |
| 5,760,979 | 6/1998 | Saito | 359/859 |

OTHER PUBLICATIONS

J. Dragesco, High Resolution Astrophotography, Cambridge University Press (1995) pp.xiii, 17, 20–24.

J.B. Sidgwick, Amateur Astronomer's Handbook, Dover Publications, Inc. (1971) pp. 161–184, 363–367.

J. Texereau, How to Make a Telescope, 2nd Edition William–Bell, Inc. (1984) pp. 139–154.

*Primary Examiner*—Cassandra Spyrou
*Assistant Examiner*—Craig Curtis

[57] ABSTRACT

A planetary astrographic telescope of the Cassegrain type having a concave paraboloidal primary mirror and a convex secondary mirror located in the spherical zone between the primary mirror and said primary mirror's focal point. The spherical secondary mirror receives the light reflected from the primary mirror. The secondary mirror, in turn, reflects such light through an aperture in the primary mirror to a focal plane located behind the primary mirror. The spherical secondary mirror and its holder are in combination sized to be not more than twenty percent of the diameter of the primary mirror and positioned in the spherical zone of light reflected from the paraboloidal primary mirror. One embodiment of the present invention is a tube containing the concave paraboloidal primary mirror and convex spherical secondary mirror with said tube attached to and supported on a mount at a height above a support surface.

8 Claims, 2 Drawing Sheets

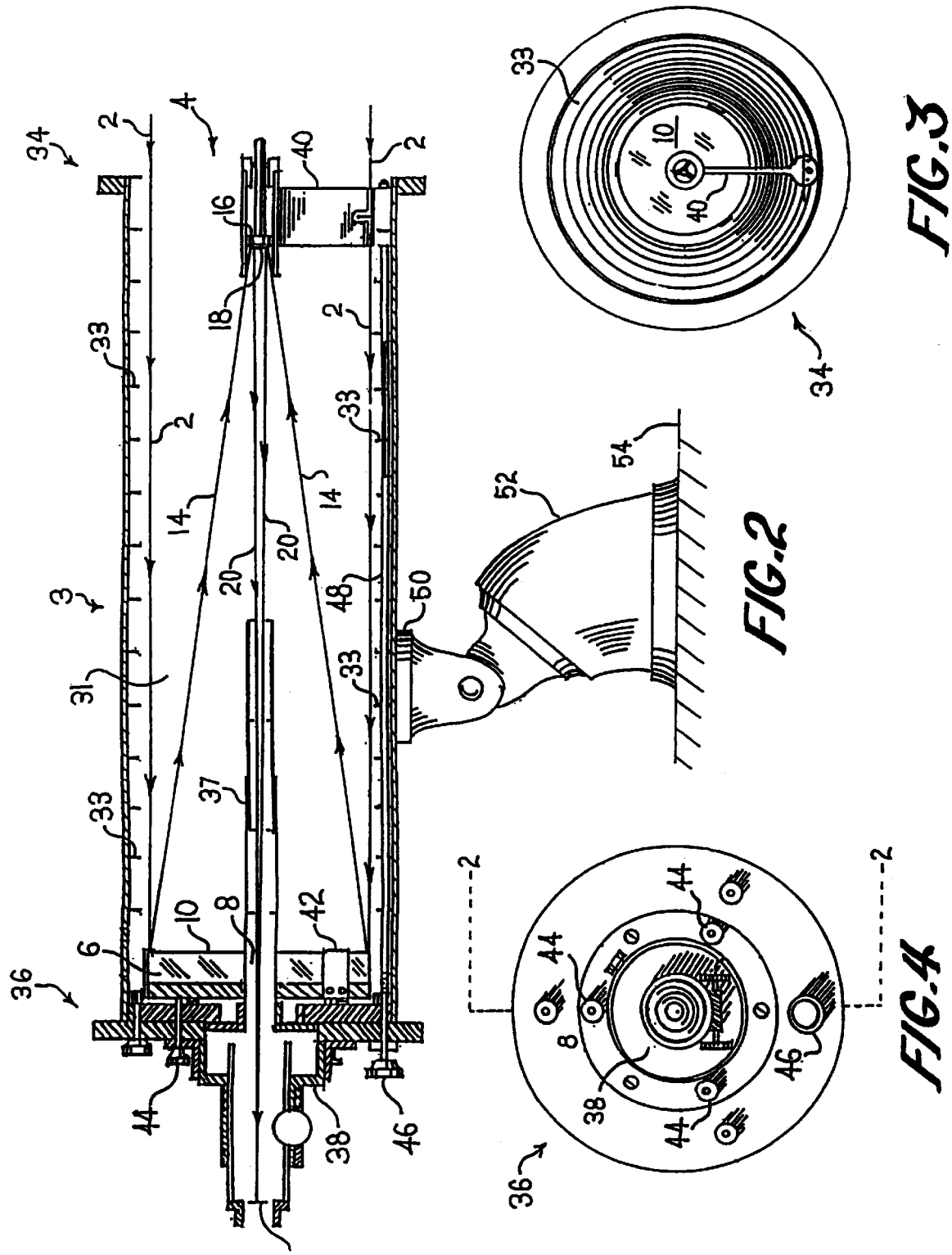

PLANETARY ASTROGRAPHIC TELESCOPE

FIELD OF THE INVENTION

The present invention relates generally to telescopes and more specifically to a planetary astrographic telescope of the Cassegrain type.

BACKGROUND OF THE INVENTION

The Cassegrain telescope, as invented in 1672 by Guillaume Cassegrain, consists principally of a paraboloidal primary mirror and a hyperboloidal secondary mirror positioned between the primary mirror and the primary mirror's focal point. Light impinging upon the primary mirror is reflected back to the secondary mirror. Such reflected light is again reflected by the secondary mirror to a focal plane generally located behind the primary mirror. The reflected light from secondary mirror usually reaches the focal plane by passing through an aperture in the primary mirror. At the focal plane, the operator of the telescope can use an ocular to magnify the image, project the image or photograph the image depending on the auxiliary apparatus attached to the telescope at or near the focal plane.

In order to perform planetary and lunar astrophotography, a highly specialized endeavor, it is necessary to have a high contrast image of a size suitable for photographic imagery.

As noted by J. Dragesco in *High Resolution Astrophotography*, Cambridge University Press, 1995, p. xiii: " . . . in high resolution work we seek to record by photography the finest details of the celestial bodies we can see with our telescopes. The resolution is defined in an angular manner, in seconds of a degree of arc(") rather than in kilometers or centimeters on the surface of the body in question." Dragesco describes, in his book, the various types of telescopes that can be used for high resolution astrophotography, particularly by amateur astronomers. An important feature of the telescope design is to have an instrument that has a long focal length (focal ratios of mirror divided by diameter of primary mirror) and a small central obstruction due to the secondary mirror and its holding structure. In the classic Cassegrain type telescope, as mentioned above, the secondary mirror is a hyperbolic mirror which is difficult to fabricate. Such difficulty in fabrication also has limited the Cassegrain design to fairly large instruments. In addition, the secondary mirror typically is 30 to 33 percent of the primary mirror's diameter. Such a large obstruction causes a degradation of the contrast of the image and alters the diffraction pattern of the image thereby reducing resolution of the telescope both of which are detrimental to high resolution astrophotography.

Various mirror combinations have been tried to overcome the impediments to high resolution astrophotography. Such combinations are described in J. B. Sidgwick's book *Amateur Astronomer's Handbook*, Dover Publications, Inc., 1980, pages 161–184, as well as in the Dragesco book. The typical Cassegrain telescope uses a hyperboloid secondary mirror. As explained in Sidgwick, p. 163–164, the secondary mirror should be a hyperbola so that the relation between the secondary mirror placement and the image planes remain constant. Modification to the Cassegrain arrangement, to avoid spherical aberrations, includes additional lens in the light path either at the input aperture or between the primary and secondary mirror. Further, in order to perform prime focus astrophotography, projection lenses and eyepieces have to be used with the typical classical and hybrid Cassegrain type telescopes to amplify the image at the focal plane. Several patents have issued concerning telescopes that use a Cassegrain type mirror arrangement. Kaprelian and Mimmack disclose in U.S. Pat. No. 4,061,420, highly corrected catadioptric telephoto lens that provides a long focal length in a relatively small tube length. The patent requires a corrector plate $L_1$ as well as corrector lens, $L_2$ and $L_3$. The addition of such lens will affect the light passing through them. Contrast and brightness is lost in each lens medium that the light must pass through. Ames discloses in U.S. Pat. No. 5,471,346 a Cassegrain telescope that uses spherical primary and secondary mirrors. However, Ames requires corrector lens $L_1$ and $L_2$ to minimize aberrations resulting from such mirror combination. Again introducing additional lens elements in the light paths reduces the contrast and brightness of the object being viewed. Such loss of brightness and contrast, in astrophotography is unacceptable.

SUMMARY OF THE INVENTION

The present invention provides a planetary astrographic telescope of the Cassegrain type having a concave paraboloidal primary mirror and a convex spherical secondary mirror located between the concave paraboloidal primary mirror and said primary mirror's focal point. The convex spherical secondary mirror receives the light reflected from the primary mirror. The secondary mirror, in turn, reflects such light through an aperture in the primary mirror to a focal plane located behind the primary mirror. The convex spherical secondary mirror and it's holder is sized, in combination, to be not more than 20.0% of the diameter of the concave paraboloidal primary mirror and are positioned in the spherical zone of the light reflected from the primary mirror. The Applicant defines the spherical zone as that portion of the light reflected from the concave paraboloidal primary mirror to the focal point of said primary mirror that will reflect back through the aperture in said primary mirror to a focal plane from a convex spherical reflective surface with negligible spherical aberration.

It is a principal feature of the present invention to provide an astrographic telescope, which at its prime focus provides a large, high contrast bright image suitable for astrophotography.

Another principal feature of the present invention is to provide an astrographic telescope which has a small central obstruction to minimize the effects on the incoming light of the object to be photographed.

An additional principal feature of the present invention is to provide an astrographic telescope that does not require additional lens in the light path between the secondary mirror and the focal plane.

A further principal feature of the present invention is to provide an astrographic telescope that does not require additional lens in the light path at the input aperture of the telescope.

Another principal feature of the present invention is to provide a prime focus astrophotographic telescope that does not require projection lenses or eyepieces to amplify the image at the focal plane.

An object of the present invention is to provide a planetary astrographic telescope of the Cassegrain type comprising a tube having a concave paraboloidal primary mirror mounted near the proximal end of said tube and a convex spherical secondary mirror mount near the distal end of said tube, with said mirrors being coaxial within said tube, with said tube having a focusable focal plane mount attached to the tube and in communication with the interior of the tube so as to be positioned to collected light reflected from the secondary mirror and further having the tube engaged and supported by a mount at a height above a support surface.

A further object of the present invention is to provide a planetary astrographic telescope suitable for high resolution astrophotography.

An important object of the present invention is to provide a planetary astrographic telescope that can be economically built by amateur astronomers.

Other principal features and advantages of the invention will become apparent to those skilled in the art upon review of the following drawings, the detailed description and appended claims.

BRIEF DESCRIPTION OF THE DRAWINGS

A more complete understanding of the invention may be obtained from the following detailed description in conjunction with the accompanying drawings of the embodiment in which:

FIG. 2 is a side view of a planetary astrographic telescope of the Cassegrain type illustrating a preferred embodiment of the paraboloidal primary mirror and spherical secondary mirror system of the present invention.

FIG. 3 is a view of the distal end of a planetary astrographic telescope of the present invention looking along the optic axis towards the primary mirror.

FIG. 4 is an end view of the proximal end of a planetary astrographic telescope of the present invention.

Figure 1:
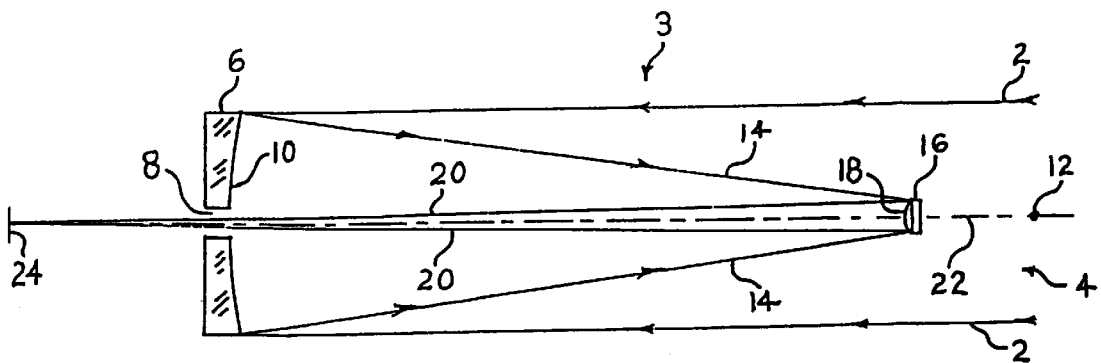
FIG. 1 is a schematic diagram of the mirror system illustrating a planetary astrographic telescope of the Cassegrain type with a paraboloidal primary mirror and a spherical secondary mirror in accord with the present invention.

Before explaining the preferred embodiment of the invention in detail, it is to be understood that the inventor is not limited in its application to the details of construction and the arrangement of the components set forth in the following description as illustrated in the drawings. The invention is capable of other embodiments or being practiced or carried out in various ways. Also, it is to be understood that the phraseology and terminology employed herein is for the purpose of the description and should not be regarded as limiting.

DETAILED DESCRIPTION OF PREFERRED EMBODIMENT

Referring now to FIG. 1, FIG. 2, and FIG. 3 there is shown a planetary astrographic telescope 3 of the Cassegrain type. The telescope 3 has an optic axis 22 which extends longitudinally and bisects the tube 30 and mirror system of said telescope. The primary mirror 6 is configured to have a concave paraboloidal shape having a reflective surface 10 and is provided with an aperture 8 centered in the primary mirror 6 and aligned along the optic axis 22 of the telescope 3. The focal point 12 of the primary mirror 6 is aligned along the optic axis 22. The telescope 3 is provided with a secondary mirror 16 having a convex spherical reflective surface 18. The secondary mirror 16 is aligned with the primary mirror 6 along the optic axis 22 and between the primary mirror 6 and the said focal point 12. Incoming light 2 passes through the input aperture 4 and impinges on the primary mirror 6, which light is then reflected from the reflective concave paraboloidal surface 10 of the primary mirror 6 toward the focal point 12. Such reflected light 14 is received by the convex spherical surface 18 of the secondary mirror 16 and reflected back towards the primary mirror 6 and through an aperture 8 in said primary mirror to a focal plane 24 located behind the primary mirror 6.

The secondary mirror is placed in the spherical zone of the light reflected 14 from the primary mirror 6. The spherical zone remains constant for a given focal ratio of the primary mirror within a range of primary mirror 6 diameters between six inches and forty-eight inches. The Applicant has determined that the spherical zone for typical F systems is as follows:

TABLE 1

Figure 5:
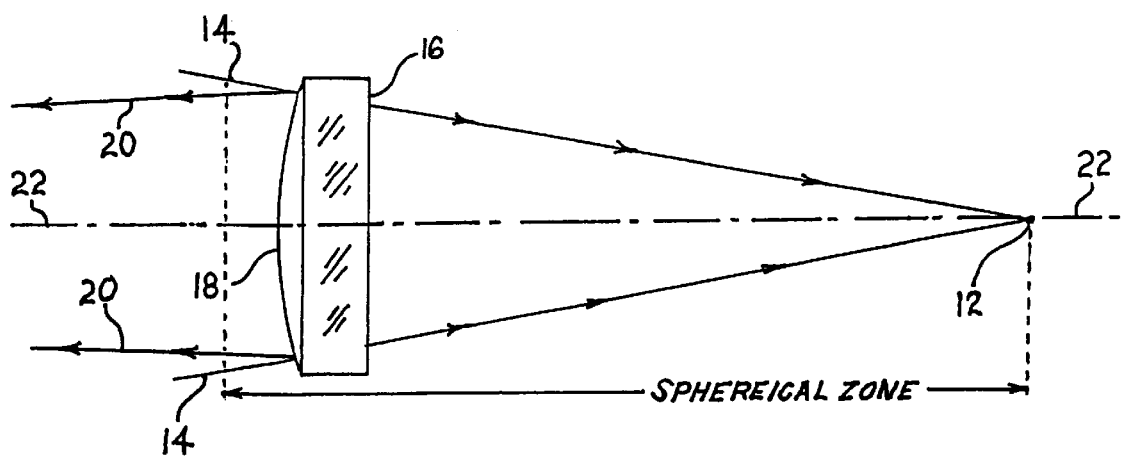
FIG. 5 is an illustration of the spherical zone of the preferred embodiment of the present invention.

| Paraboloidal Primary Mirror F-System | Spherical Zone |
|---|---|
| 4 | 2.25 inches |
| 4.5 | 3.50 inches |
| 5 | 4.75 inches |
| 6 | 9.50 inches |
| 7 | 17.00 inches | with the spherical zone being measured along the optic axis 22 from the focal point 12 toward the primary mirror 6, see FIG. 5. An operator can change the size of the final image at the focal plane 24 by changing the spherical secondary mirror 16 with one having an appropriate radius of curvature for the desired image size.

TABLE 1a

| | Secondary Mirror Group | | | |
|---|---|---|---|---|
| Compound Focal Length | Optical Diameter | Mirror Diameter | Radius of Curvature | Spherical Zone Location |
| F-70 | 0.562 | 1.0 | 4.77 | 2.25 |
| F-100 | 0.402 | 1.0 | 3.35 | 1.61 |
| F-125 | 0.325 | 1.0 | 2.68 | 1.30 |
| F-150 | 0.275 | 1.0 | 2.24 | 1.09 |

All dimensions are in inches

Table 1a. shows a group of convex spherical secondary mirrors having the characteristics required to provide a desired image size at the focal plane 24 in a paraboloidal 8-inch primary mirror F-4 system. The spherical zone location shown in the table 1a. is the distance from the focal point 12 to the convex spherical surface 18 of the secondary mirror 16 measured along the optic axis 22. The operator of the telescope 3 can interchange the secondary mirror from this group much like an operator would change oculars in the typical Cassegrain telescope to change image size. If the operator of the telescope 3 attempts to place the secondary mirror 16 further from the focal point 12, for a given F mirror system, than shown in Table 1, a convex spherical mirror will not work and a typical hyperboloidal secondary mirror will have to be used and in some instances additional lens will have to be used.

Table 2 shows examples of telescope mirror systems for various F-ratios of an eight inch primary mirror and correspondingly sized convex spherical secondary mirror to keep the central obstruction at or below twenty percent of the primary mirror diameter in accord with the present invention. The dimensions for the various secondary mirrors are those that can be used within the spherical zone for a given F-system of the primary mirror diameter before a hyperboloidal secondary mirror is required.

TABLE 2

Eight Inch Planetary Astrographic Telescope Systems

| F-System | F-4 | F-4.5 | F-5 | F-6 | F-7 |
|---|---|---|---|---|---|
| Secondary Mirror | | | | | |
| OD (in.) | 0.562 | 0.777 | 0.950 | 1.230 | 1.230 |
| ODH (in.) | 0.937 | 1.150 | 1.320 | 1.600 | 1.600 |
| CO % | 12.0 | 14.4 | 16.5 | 20.0 | 20.0 |
| CF | F-70 | F-54 | F-47 | F-41 | F-47 |
| FD | 3.0 | 5.0 | 8.5 | 12.5 | 11.0 |
| AIP | 1.0" | 1.0" | 1.0" | 1.0" | 1.0" |

8 inch Paraboloidal Primary Mirror
OD = Spherical Secondary Mirror - optical diameter in inches
ODH = Spherical Secondary Mirror - optical diameter plus holder in inches
CO % = Central Obstruction Percentage (ODH/8) × 100
CF = Compound focal length
FD = Field diameter in arc minutes
AIP = Aperture in primary mirror The spherical secondary mirror may be smaller than shown in Table 2. but the exact dimensions of it's diameter and it's spherical radius are selected by the operator. The relationship between the diameter of the secondary and primary mirrors is determined by the formulae explained in the Jean Texereau book *How to Make a Telescope,* second edition, Chapter 6, William-Bell, Inc., (1984), but for a typical Cassegrain type telescope. The Applicant, in practicing the present invention, extends the study into the spherical zone so that a spherical mirror instead of a hyperboloidal secondary mirror is used. A resultant effect of using a spherical mirror in the spherical zone is that the image at the focal plane does not have to be amplified for prime focus astrophotography.

The Applicant has determined that in the spherical zone of light reflected from the concave paraboloidal primary mirror 6, a convex spherical secondary mirror 16 rather than a typical hyperboloid secondary mirror can be used to reflect light back to the focal plane 24 behind the primary mirror 6. Within the spherical zone for a given F-system, as shown in Table 1., the convex mirror surface deviations are nearly equal but most importantly such deviations are less than one-tenth of a wave length of the incoming light 2 to the telescope 3. Placing the secondary mirror 16 of the present invention in the spherical zone results in a small secondary mirror and therefore a smaller central obstruction, as shown in Table 2. Further, the secondary mirror of the present invention has a convex spherical reflective surface 18 which is easier to fabricate than a hyperboloidal mirror used in a typical Cassegrain type telescope. Additionally, barlow lenses, projection lenses, and eyepieces are not required to amplify the image being photographed.

The preferred embodiment of the present invention has a primary mirror 6 having a focal ratio of about four and a diameter of about eight inches, yielding a focal length of approximately thirty-two inches. The spherical secondary mirror 16 is approximately one inch in diameter or twelve and one-half percent (12.5%) of the diameter of the primary mirror. The spherical secondary mirror 16 is located coaxially with the primary mirror 6 along the optic axis 22, at a distance from the focal point 12 of the primary mirror 6 of between 0.5 to 2.250 inches of said focal point. The preferred embodiment location of the secondary mirror 16 is 2.250 inches from the focal point 12. At such location, and in the nature of a Cassegrain type telescope, the optical power for said telescope is provided by said primary mirror 6 and secondary mirror 16 and forming a focal plane 24 behind the primary mirror. The resulting compound focal length of the telescope is approximately five hundred sixty-four (564) inches or 14,382 millimeters, thereby providing a compound focal ratio for the telescope of approximately F70. The relative size of the secondary mirror 16 and its holder 40 is best seen in FIG. 3. Because of such small obstruction, less than 15 percent of the diameter of the primary mirror, more light 2 passes to the primary mirror 6 resulting in a brighter and better resolved image at the image plane 24 with minimal aberrations. In addition, the present invention does not require a projection lens or eyepiece to amplify the image at the image plane 24 during prime focus astrophotography.

One embodiment of the present invention incorporates the mirror system illustrated in FIG. 2 into a telescope. A tube 30 having a distal end 34 and a proximal end 36 is attached to a telescope holder 50 on a mount 52 supported at a height above a support surface 54. The tube can be made of any suitable material such as wood, fiberglass, metal, or composite material. The preferred embodiment uses an aluminum, circular cross-section thin wall tube. It should be understood that the tube as used herein can also comprise a structure made of a plurality of struts supporting the primary mirror 6 from the secondary mirror 16. The tube can also comprise a single member separating and supporting the primary mirror and the secondary mirror of the telescope. The size and weight of the mirrors as well as the costs of materials usually governs the particular tube construction and style used by the operator.

The preferred embodiment of the present invention also has the primary mirror 6 mounted in a primary mirror holder 42 near the proximal end 36 of the tube 30 and the secondary mirror 16 mounted in a secondary mirror holder 40 near the distal end 34 of the tube 30. The primary mirror 6 is collimated by a plurality of adjustors 44 that threadingly engages the primary mirror holder 42. The telescope 3 is focussed by a focus adjustor 46 attached to a focus rod 48 engaging the secondary mirror holder 40. An operator moves the secondary mirror holder 40 towards or away from the primary mirror 6 by using the focus adjustor 46 thereby bringing an image into focus at the focal plane 24 of the telescope 3. As is typical of a Cassegrain type telescope the focal plane 24 is behind the primary mirror 6. In the preferred embodiment of the present invention, a focusable focal plane mount 38 is attached to the tube 30 and is in communication with the interior 31 of the tube. The light reflected 20 from the convex spherical surface 18 of the secondary mirror 16 is collected at the focal plane 24. At the focal plane 24, the operator of the telescope can install a suitable ocular and lens compressor to view the image or install a suitable film plate or electronic detector to record the image at the focal plane 24. Stray light in the interior 31 of the tube 30 is minimized by a plurality of glare stops 33 attached to the tube 30 and by a baffle tube 37 positioned in the aperture 8 of the primary mirror 6.

Thus, it should be apparent that there has been provided in accordance with the present invention a planetary astrographic telescope of the Cassegrain type having a concave paraboloidal primary mirror and a convex spherical secondary mirror located in the spherical zone between the primary mirror and said primary mirror's focal point that satisfies the objectives and advantages set forth above. Although the invention has been described in conjunction with specific embodiments thereof, it is evident that many alternatives, modifications, and variations will be apparent to those skilled in the art. Accordingly, it is intended to embrace all such alternatives, modifications, and variations that fall within the spirit and broad scope of the appended claims.

What is claimed is:

1. A planetary astrographic telescope of the Cassegrain type having an optic axis, the telescope comprising: a concave paraboloidal primary mirror having a focal point and a convex spherical secondary mirror located between the primary mirror and the focal point along the optic axis and receiving light reflected from the primary mirror without additional lens in any light path, the secondary mirror reflecting such light through an aperture in the primary mirror to a focal plane located behind the primary mirror without additional lens in any light path.

2. The planetary astrographic telescope of claim 1 wherein the diameter of the convex spherical secondary mirror is not more than twelve and one-half percent (12.5%) of the diameter of the primary mirror.

3. A planetary astrographic telescope of the Cassegrain type having an optic axis comprising: a concave paraboloidal primary mirror having a focal point; and a convex spherical secondary mirror, with the primary and secondary mirrors disposed coaxial with respect to each other along the optic axis and having no additional intervening lens; the secondary mirror positioned for a selected focal length within a range of 0.5 to 2.5 inches of the focal point of the primary mirror so that optical power for the telescope is provided by said primary and secondary mirrors and a focal plane is formed behind the primary mirror without additional lens in any light path from the focal plane to a light source outside the telescope.

4. The planetary astrographic telescope of claim 3 wherein the concave paraboloidal primary mirror is approximately eight inches in diameter and configured to have a focal ratio of 4 and the convex spherical secondary mirror is not more than one (1) inch in diameter whereby the compound focal length of the telescope is approximately 564 inches (14,382 millimeters).

5. The planetary astrographic telescope of claim 3 wherein the convex spherical secondary mirror is one selected from a group consisting of secondary mirrors having the characteristics as follows:

| Compound Focal Length (inches) | Optical Diameter (inches) | Mirror Diameter (inches) | Radius of Curvature (inches) | Spherical Zone Location (inches) |
|---|---|---|---|---|
| F-70 | 0.562 | 1.0 | 4.77 | 2.25 |
| F-100 | 0.402 | 1.0 | 3.35 | 1.61 |
| F-125 | 0.325 | 1.0 | 2.68 | 1.30 |
| F-150 | 0.275 | 1.0 | 2.24 | 1.09 |

6. The planetary astrographic telescope of claim 3 including a tube having a distal end and a proximal end wherein the primary mirror is mounted near the proximal end and the secondary mirror is mounted near the distal end; a focusable focal plane mount attached to the tube and in communication with the interior of the tube so as to be positioned to collect light reflected from the secondary mirror; and a mount for engaging the tube at a height above a support surface.

7. A planetary astrographic telescope of the Cassegrain type having an optic axis, the telescope comprising: a concave paraboloidal primary mirror having a focal point and a convex spherical secondary mirror positioned between the primary mirror and the focal point along the optic axis without an intervening lens and the secondary mirror receiving light from the primary mirror in a spherical zone, the secondary mirror reflecting such light in said spherical zone back through an aperture in the primary mirror to a focal plane located behind the primary mirror without additional lens in any light path.

8. The planetary astrographic telescope of claim 7 wherein the convex secondary mirror and its holder constitutes a central obstruction of not more than twenty percent (20%) of the primary mirror diameter.

\* \* \* \* \*